United States Patent
Sasaki et al.

(10) Patent No.: US 7,192,196 B2
(45) Date of Patent: Mar. 20, 2007

(54) OPTICAL FIBER CONNECTION COMPONENT, OPTICAL FIBER CONNECTION STRUCTURE, AND OPTICAL FIBER CONNECTION METHOD

(75) Inventors: Kyoichi Sasaki, Shizuoka (JP); Ritsu Kawase, Shizuoka (JP); Masayoshi Suzuki, Shizuoka (JP); Tatsushi Kobayashi, Shizuoka (JP)

(73) Assignee: Tomoegawa Paper Co., Ltd., Tokyo (JP)

(*) Notice: Subject to any disclaimer, the term of this patent is extended or adjusted under 35 U.S.C. 154(b) by 0 days.

(21) Appl. No.: 10/521,372

(22) PCT Filed: Jul. 14, 2003

(86) PCT No.: PCT/JP03/08915

§ 371 (c)(1),
(2), (4) Date: Jan. 12, 2005

(87) PCT Pub. No.: WO2004/008213

PCT Pub. Date: Jan. 22, 2004

(65) Prior Publication Data

US 2005/0238291 A1    Oct. 27, 2005

(30) Foreign Application Priority Data

Jul. 15, 2002 (JP) .............................. 2002-205328

(51) Int. Cl.
*G02B 6/38* (2006.01)
(52) U.S. Cl. ..................... 385/75; 385/56; 385/59; 385/66; 385/72

(58) Field of Classification Search ............... None
See application file for complete search history.

(56) References Cited

U.S. PATENT DOCUMENTS 5,581,645 A * 12/1996 Gehri ................... 385/78

(Continued)

FOREIGN PATENT DOCUMENTS

JP        U 04-85305        7/1992

(Continued)

*Primary Examiner*—Michelle Connelly-Cushwa
*Assistant Examiner*—Jerry T. Rahll
(74) *Attorney, Agent, or Firm*—Knobbe, Martens, Olson & Bear LLP (57) ABSTRACT

An optical fiber connection component which is easy to adjust the distance between the optical fiber ends before connection, hardly damages the optical fiber during transportation or connection, and saves the number of parts and the cost, and a method for connecting optical fibers by using this component. The optical fiber connection component used for the optical fiber connection method consists of a connection member having one or more optical fiber through-holes provided with guides for rodlike coupling member at or near both side ends, rodlike coupling members, and a plug having through-holes for rodlike coupling members. The connection member is arranged in the plug slidably with the rodlike coupling member inserted in the plug. Two such optical fiber connection components are opposed to the optical fiber inserted in the through-hole to butt the through-holes of both the connection members against each other. Both the connection members are slid in the direction of the center axis of the optical fiber along the rodlike coupling member guided by the guide, so that the optical fibers are jointed in the through-hole of one connection member.

10 Claims, 10 Drawing Sheets

U.S. PATENT DOCUMENTS

5,838,856 A * 11/1998 Lee .............................. 385/54
6,435,728 B2 * 8/2002 Shimoji et al. ............... 385/56

FOREIGN PATENT DOCUMENTS

| JP | 09-258063 | 10/1997 |
| JP | 10-048477 | 2/1998 |
| JP | 10-170759 | 6/1998 |
| JP | 11-14862 | 1/1999 |
| JP | 2000-292652 | 10/2000 |
| WO | WO 00/08503 | 2/2000 |

* cited by examiner

OPTICAL FIBER CONNECTION COMPONENT, OPTICAL FIBER CONNECTION STRUCTURE, AND OPTICAL FIBER CONNECTION METHOD

This application is the U.S. National Phase under 35 U.S.C. § 371 of International Application PCT/JP2003/008915 filed on Jul. 14, 2003, which claims priority of Japanese Patent Application No. 2002-205328, which was filed on Jul. 15, 2002. The International Application was published under PCT Article 21(2) in a language other than English.

TECHNICAL FIELD

The present invention relates to an optical fiber connection component, an optical fiber connection structure and an optical fiber connection method, and in particular to an optical fiber connection component capable of connecting collectively a number of optical fibers of multi-core optical fibers, an optical fiber connection structure using said components and a method for connecting optical fibers.

BACKGROUND ART

In optical connection between a plurality of optical elements in an optical circuit package, or optical connection between optical fibers led out of a plurality of optical circuit packages or optical circuit devices on which an optical circuit package has been mounted, an optical connector or mechanical splicer is generally installed between ends of optical fibers led out of optical elements, optical circuit packages, optical circuit devices and/or the like to connect the optical fibers, or the optical fibers are mutually connected by fusing connection.

However, the current optical connector requires PC (physical contact) connection for connecting the optical fibers. For reasons of that, it is necessary to insert and fix the optical fibers into a ferrule made of zirconia, glass, ceramic or the like and then polish the optical fibers. Therefore, a process for connecting the optical fibers is considerably complicated, and it takes a long time for the polishing step.

On the other hand, the connection by the mechanical splicer in which no polishing step is required and the fusing connection requires positioning the optical fibers, whose claddings have been exposed, in a V-shaped groove or within a capillary. In such a case, there has been a possibility that the claddings of the optical fibers may be damaged. In particular, when the optical fibers are positioned within a glass capillary as described in Japanese Patent Application Laid-Open No. 160564/1999, the claddings of the optical fibers have come into contact with the capillary, and so there is a high possibility that ends of the claddings of the optical fibers may be damaged. Another problem is that the connecting operation takes a long time and it causes a poor yield rate.

The above publication and Japanese Patent Application Laid-Open No. 264914/1999 show that a slot is provided in a capillary to fill a joint between the optical fibers with an adhesive or refractive index matching agent. In such a case, the mechanical strength of the capillary becomes very weak due to the provision of the slot, and the slot portion may be broken during a connecting operation.

In the prior multi-fiber connectors, it becomes difficult to align the optical fibers to each other as the number of optical fibers increases. Because the distance between the optical fibers and through-holes into which guide pins are inserted for alignment increases and it causes a large errors on positioning. Further, when some ferrules have a different thermal expansion coefficient to each other, there is a possibility that the relative position of the holes into which optical fibers are inserted shifts depending on environmental changes, thereby increasing an optical loss.

As a method for solving the above-mentioned problems, it has been proposed in Japanese Patent Application No. 2002-053484 that two optical fibers are connected by providing two connecting members having each a through-hole, into which an optical fiber has been inserted, bringing them face to face with each other, and sliding then the connecting members. However, since this method does not use a member for keeping the position of the connecting members holding the optical fibers, it is impossible to keep distances between the ends of optical fibers to be connected equal, and so it is necessary to adjust the distance for every connection between pairs of optical fibers. Moreover, upon carrying the connecting members provided each with an optical fiber or connecting them, discrepancy in position is caused between the center axis of the optical fiber and the axis of the through-hole of the connecting member. Accordingly, there is a possibility that the optical fibers are damaged when the connecting members are slid to the optical fibers, which reduces the handling workability of the connecting members under connecting operation. Still more, in this method, an aligning member and a fixing member are used for aligning and fixing the connecting members. Therefore, there is a possibility of increasing cost because of using many parts. In addition, since parts for connection are not unified, the connection process becomes complicated. No proposal is shown as an optical fiber connection component to unify some parts.

The present invention has been completed for the purpose of solving the above problems in the prior arts. An object of the present invention is to provide an optical fiber connection component which is easy to adjust the distance between the optical fiber ends upon aligning the optical fibers and, particularly, those coats of which have been removed, in case of connecting optical fibers led out of the edges of optical elements, optical circuit packages, optical circuit devices, etc., and which hardly damages the optical fibers during carrying or connection, and saves the number of parts and the cost. Another object of the present invention is to provide an optical fiber connecting method using said optical fiber connection components, and to provide an optical fiber connection structure formed by said method.

DISCLOSURE OF THE INVENTION

An optical fiber connection component according to the present invention comprises a connection member having one or a plurality of through-holes for optical fibers provided with guides for rodlike coupling member at or near both side edges, rodlike coupling members, and a turned square U-shaped plug having a through-hole(s) or a groove(s) for inserting an optical fiber(s) and guide holes for rodlike coupling members on the bottom of the concavity of square U-shape, wherein said connection member is arranged slidably in the plug by being installed in the concavity of square U-shape of said plug by means of the rodlike coupling member inserted in said plug.

In the present invention, the guide may have a form of through-hole or groove. The rodlike coupling member is preferred to be cylindrical. In the present invention, two or more of the above-mentioned connection members may be installed in the plug. Further, the plug to be used may have one or more through-holes or grooves for inserting optical fibers.

An optical fiber connecting method according to the present invention comprises providing the above-mentioned two optical fiber connection components, inserting optical fibers into through-holes of the connection members respectively, opposing the connection members of said two optical fiber connection components to each other, bringing the through-holes of both connection members face to face with each other, and sliding both connection members in a direction of the center axis of the optical fibers along the rodlike coupling member guided by the guide, so that the optical fibers are connected in the through-hole of one connection member.

In the above-mentioned case, the optical fibers inserted to the through-holes of the connection member may be fixed to the plug by an adhesive. Further, the above-mentioned two optical fiber connection components may be attached to an adapter so as to bring the through-holes of the connection members face to face with each other.

The optical fiber connection structure according to the present invention is characterized in that it is connected by the above-mentioned connecting method. Namely, it has a structure which comprises two optical fiber connection components composed each of a connection member having one or a plurality of through-holes for optical fibers provided with guides for rodlike coupling member at or near both side edges, rodlike coupling members, and a turned square U-shaped plugs having a through-hole(s) or a groove(s) for inserting an optical fiber(s) and guide holes for rodlike coupling members on the bottom of the concavity of square U-shape, and optical fibers inserted into the through-holes of the connection members of said two optical fiber connection components, wherein said connection member is arranged slidably in the plug by being installed in the concavity of square U-shape of said plug by means of the rodlike coupling members inserted in said plug, and said structure being formed by opposing two optical fiber connection components in such a state that the optical fibers are inserted respectively in said through-holes for the optical fibers, bringing the through-holes of both connection members face to face with each other, and sliding said connection members in a direction of the center axis of the optical fibers along the rodlike coupling members guided by the guides, so that the optical fibers are connected in the through-hole of one connection member. In this case, the optical fiber connection components may be attached to an adapter.

EXPLANATION OF SYMBOLS 1a and 1b . . . optical fiber connection component, 10, 10', 10a and 10b . . . connection member, 11 and 12 . . . guide hole, 13 . . . through-hole, 15 and 16 . . . projection, 20, 20a and 20b . . . plug, 21 and 22 . . . guide hole, 23 . . . hole (for fixing), 24 . . . groove, 28 . . . adhesive, 29 . . . cover plate, 31 and 32 . . . guide pin, 41 . . . optical fiber, 51 . . . adapter, 52 . . . latch.

BEST MODE FOR CARRYING OUT THE INVENTION

The embodiments of the present invention will hereinafter be described with reference to the accompanying drawings.

Figure 1:
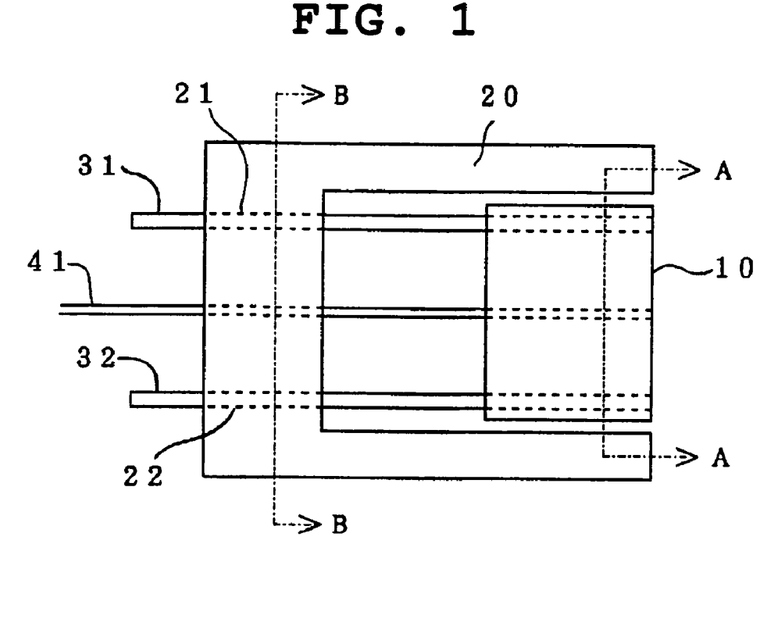
FIG. 1 is a plane view of an exemplary optical fiber connection component according to the present invention.
Figure 2:
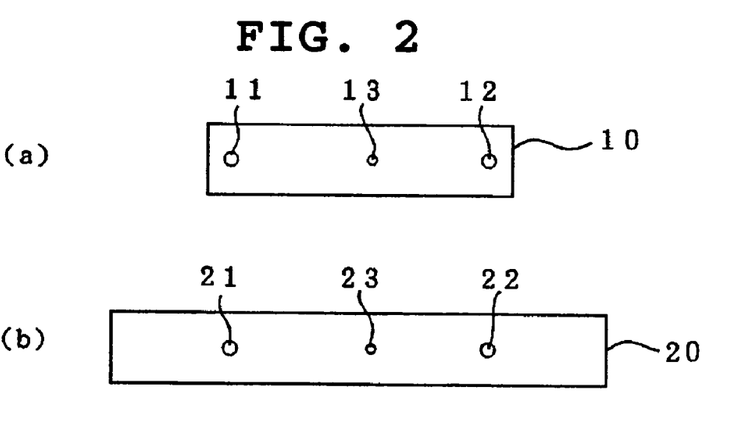
FIG. 2 shows a sectional view of the connection member in A—A line of FIG. 1 and a sectional view of the plug in B—B line of FIG. 1.

FIG. 1 is a plane view of an exemplary optical fiber connection component according to the present invention, FIG. 2(a) is a sectional view of the connection member in A—A line of FIG. 1 and FIG. 2(b) is a sectional view of the plug in B—B line of FIG. 1. In the drawings hereinafter, the optical fiber connection component shows the state that one or more optical fibers have been inserted in the optical fiber connection component. In FIGS. 1 and 2, a connection member 10 has a through-hole 13 for inserting an optical fiber and is provided with guide holes for rodlike coupling members as the guides at or near both side edges. Namely the connection member is provided with through-holes as the guide holes 11 and 12 for inserting guide pins 31 and 32. A plug 20 has guide holes 21 and 22 for inserting guide pins 31 and 32 and a hole (fixing hole) 23 for inserting an optical fiber. The guide pins 31 and 32 are inserted into the guide holes 21 and 22 of the plug so as to penetrate them, and ends of the guide pins are inserted to the guide holes 11 and 12 of the connection member 10. Thus the connection member 10 is integrated in the plug 20 slidably by means of the guide pins 31 and 32.

Figure 3:
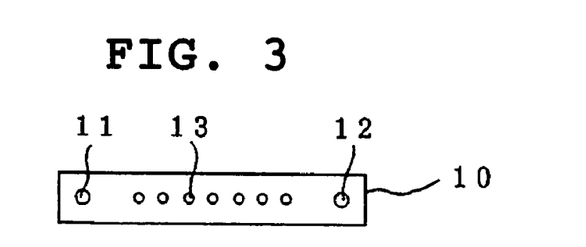
FIG. 3 is a cross sectional view of another exemplary connection member of the optical fiber connection component according to the present invention.

FIG. 3 is a cross sectional view of another exemplary connection member. The connection member 10, which is provided with a lot of through-holes 13 in a row so that a lot of optical fibers can be connected simultaneously, is arranged slidably in the plug in the same manner as described above.

Figure 4:
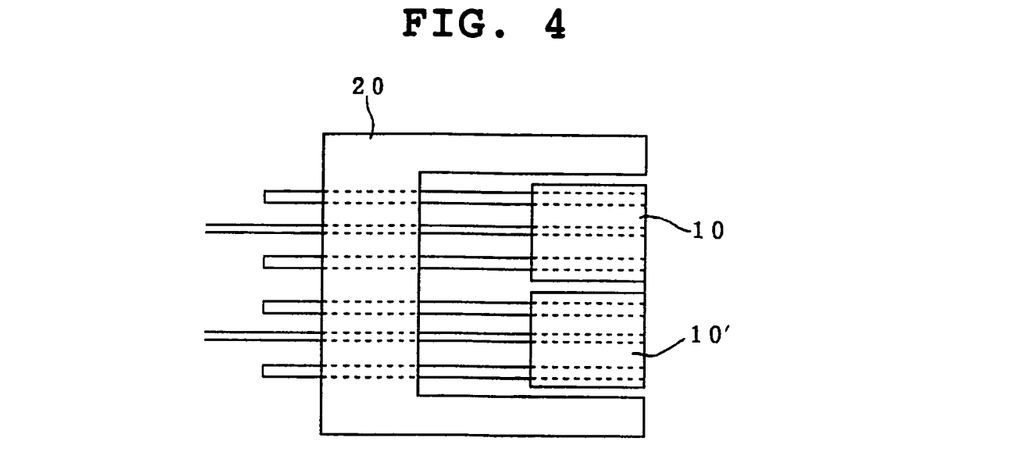
FIG. 4 is a plane view of another exemplary optical fiber connection component according to the present invention.

FIG. 4 is a plane view of another exemplary optical fiber connection component according to the present invention. In this case, since a plug 20 is provided with two pairs of guide holes (through-holes for inserting each a guide pin), two connection members 10 and 10' are arranged slidably in the plug by means of guide pins inserted in said plug.

Figure 5:
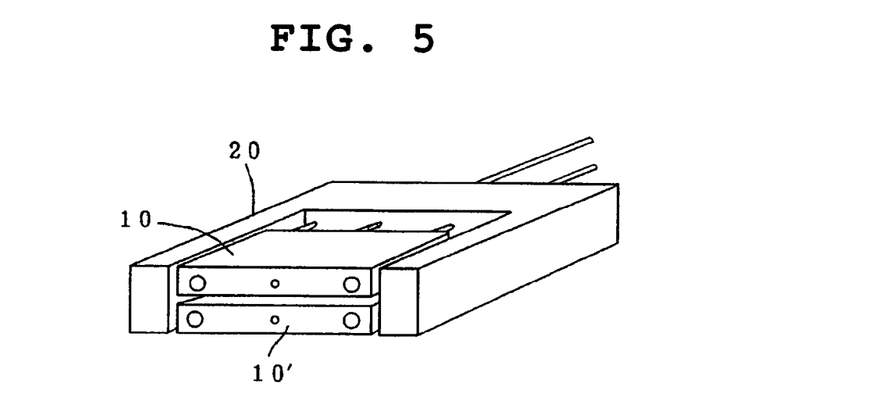
FIG. 5 is a perspective view of another exemplary optical fiber connection component according to the present invention.

FIG. 5 is a perspective view of another exemplary optical fiber connection component according to the present invention. In this case, two connection members 10 and 10' are arranged slidably in a plug 20 in such a state that they are piled up in a perpendicular direction.

Figure 6:
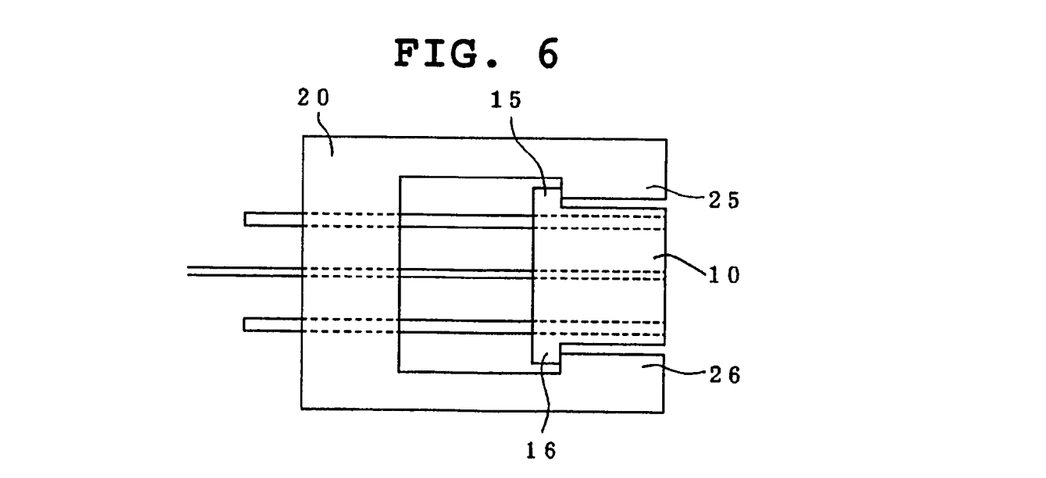
FIG. 6 is a plane view of a further exemplary optical fiber connection component according to the present invention.

FIG. 6 is a plane view of a further exemplary optical fiber connection component according to the present invention. In this case, the optical fiber connection component has a structure that a plug 20 has projections 25 and 26, and a connection member 10 has also projections 15 and 16, whereby the projections are engaged with each other so that the connection member 10 is prevented to separate from the plug 20. Namely, the connection member 10 is arranged in the plug 20 by installing guide pins in such a manner that projections 15 and 16 of the connection member engage with projections 25 and 26 of the plug respectively.

Figure 7:
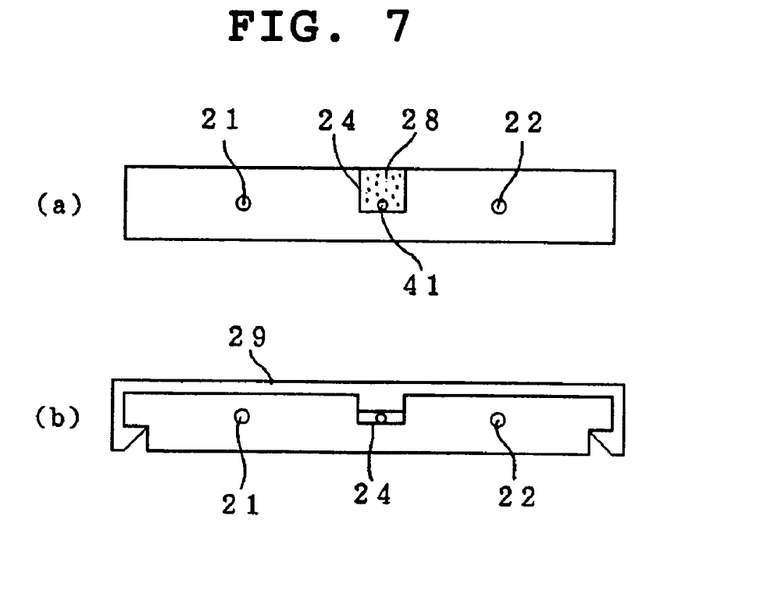
FIG. 7 is a cross sectional view of another exemplary plug used for the optical fiber connection component according to the present invention.

FIG. 7 is a cross sectional view of another exemplary plug used in the optical fiber connection component according to the present invention. In FIG. 7(a), the plug is provided with a groove 24 for inserting an optical fiber 41, and in FIG. 7(b), a cover plate 29 having a projection for inserting in the groove is provided over the groove so as to fix the optical fiber. The groove may be filled with an adhesive 28 for fixing the optical fiber.

No particular limitation is imposed on material of the plug so far as it can support the optical fiber and the connection member and can keep their shape. The material can be suitably chosen for use depending on application purpose, the kind of optical fibers, and installation environment. However, glass, plastic, ceramic, etc. are preferred to use. Furthermore, the plug may have a groove(s) as described above.

The connection member is suitably chosen for use depending on the kind of used optical fibers and an installation environment. However, the connection member using a glass capillary, plastic capillary, metallic capillary or ceramic capillary is preferred to use. Furthermore, it may be composed of several kinds of composite materials. For example, a connection member in which a glass capillary is arranged on a plastic or glass member having a V-shaped groove and metal tubes are provided as guide hole, which are fixed by a fixing member, can be used. No particular limitation is imposed on the number of the through-hole or the guide hole for optical fiber prepared in the connection member so far as the connection member can hold its mechanical strength, its accurate position and hole shape. For example, as illustrated in FIG. 3, a connection member in which a lot of through-holes are provided in a row so as to be capable of simultaneous connection of multi-core optical fibers can be used. It is also possible to provide the through-holes more than the number of optical fibers to be connected for maintenance. The shape of the through-hole provided in the connection member is suitably selected depending on the cross-sectional form of used optical fibers. For example, a through-hole which is circular, triangular or rectangular in cross section is preferably used when cylindrical optical fibers are connected with each other. Incidentally, it is possible to use a connection member which is prepared by mounting a flat plate on an upper face of an aligning member having a V-shaped groove, thereby forming a through-hole triangular in cross section. A through-hole whose inner diameter is the largest at the edges thereof and is the smallest at the central part is preferred so as to make insertion of the optical fiber easier. For example, those beveled or shaped in a conical form at the end surfaces thereof are preferably used. Incidentally, no particular limitation is imposed on the external form of the connection member.

As the rodlike coupling member, a cylindrical rod, triangular rod, tetragonal (polygonal) rod, or oval rod can be used. However, the cylindrical rod is particularly preferred to use because of easy arrangement and fabrication. As the cylindrical rod, for example, a guide pin can be used. No limitation is imposed on the form of the guide pin so far as it can be inserted in the guide hole for positioning the connection member. For example, it is possible to use a guide pin which has a form different from that of the guide hole. Incidentally, no limitation is imposed on the number of the guide pins and of the guide holes.

The optical fibers used in the optical fiber connection component according to the present invention is suitably chosen for use depending on the application purposes, and, for example, single mode optical fibers and multi-mode optical fibers made of quartz or plastics can be suitably used.

Next, the optical fiber connecting method according to the present invention will be illustrated in reference to the drawings.

Figure 8:
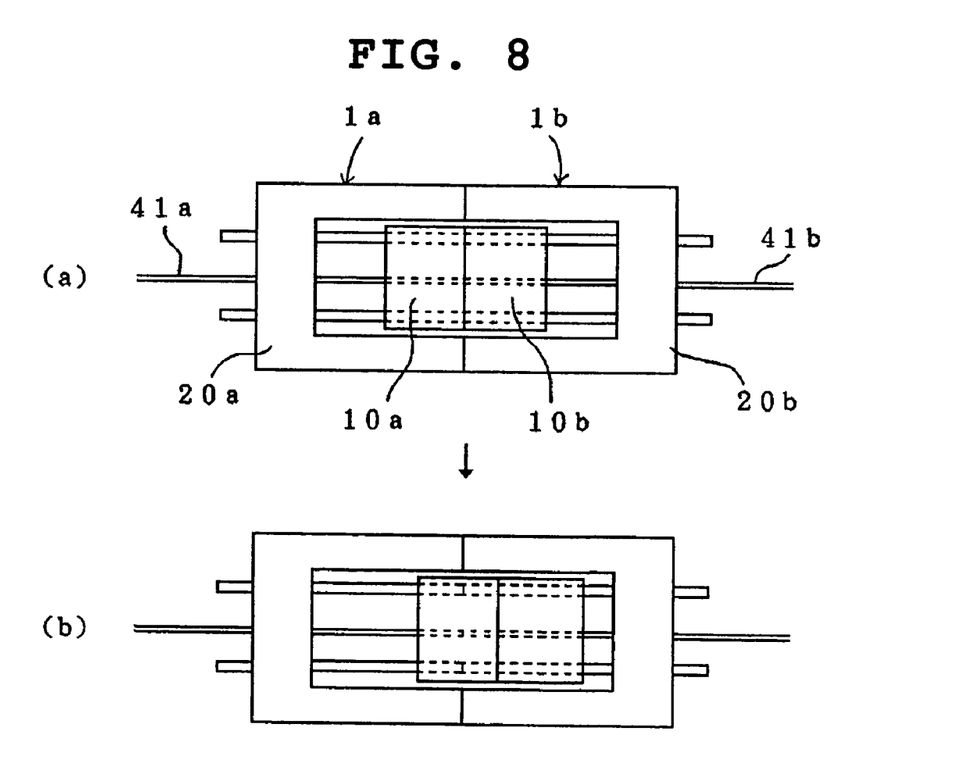
FIG. 8 is a flow chart illustrating an exemplary connecting method according to the present invention.

FIG. 8 is a flow chart illustrating an exemplary connecting method according to the present invention.

As illustrated in FIG. 1 and FIG. 2, an optical fiber 41 is inserted into a through-hole 13 of a connection member 10 and the optical fiber is then inserted into a hole 23 of a plug 20 to fix permanently or temporarily. The connection member 10 is installed in the plug 20 by inserting guide pins 31 and 32 respectively into guide holes 11 and 12 of the connection member 10 and guide holes 21 and 22 of the plug 20 so that the connection member 10 and the plug 20 integrate to form an optical fiber connection component into which an optical fiber is inserted. Thus the connection member is fixed to the plug in a state that the connection member is slidable in only the direction of the center axis of the optical fiber to result in no damage of the optical fiber. Namely, the optical fiber is not damaged at the edge of the connection member upon carrying the connection member.

Another optical fiber connection component is provided by the same manner as described above. Thereafter, both optical fiber connection components 1a and 1b are opposed to each other so that the connection member 10a of the optical fiber connection component 1a and the connection member 10b of the optical fiber connection component 1b are brought face to face with each other, as illustrated in FIG. 8(a). Two connection members 10a and 10b are then allowed to simultaneously slide in one direction (right direction in the drawing) along the guide pins, whereby the connection members are arranged and the optical fibers 41a and 41b fixed permanently or temporarily to the plugs 20a and 20b are connected inside the through-hole of the connection member 10a (FIG. 8(b)). Alternatively, two connection members are first fixed to each other by guide pins by pushing each guide pin which has been inserted in the guide hole of one connection member in the guide hole of the other connection member, and the two connection members are then allowed to slide in one direction. As mentioned above, since the through-holes of the connection members are aligned, the optical fiber inserted in the through-hole can be inserted easy into the through-hole of the other connection member without causing damages.

Figure 9:
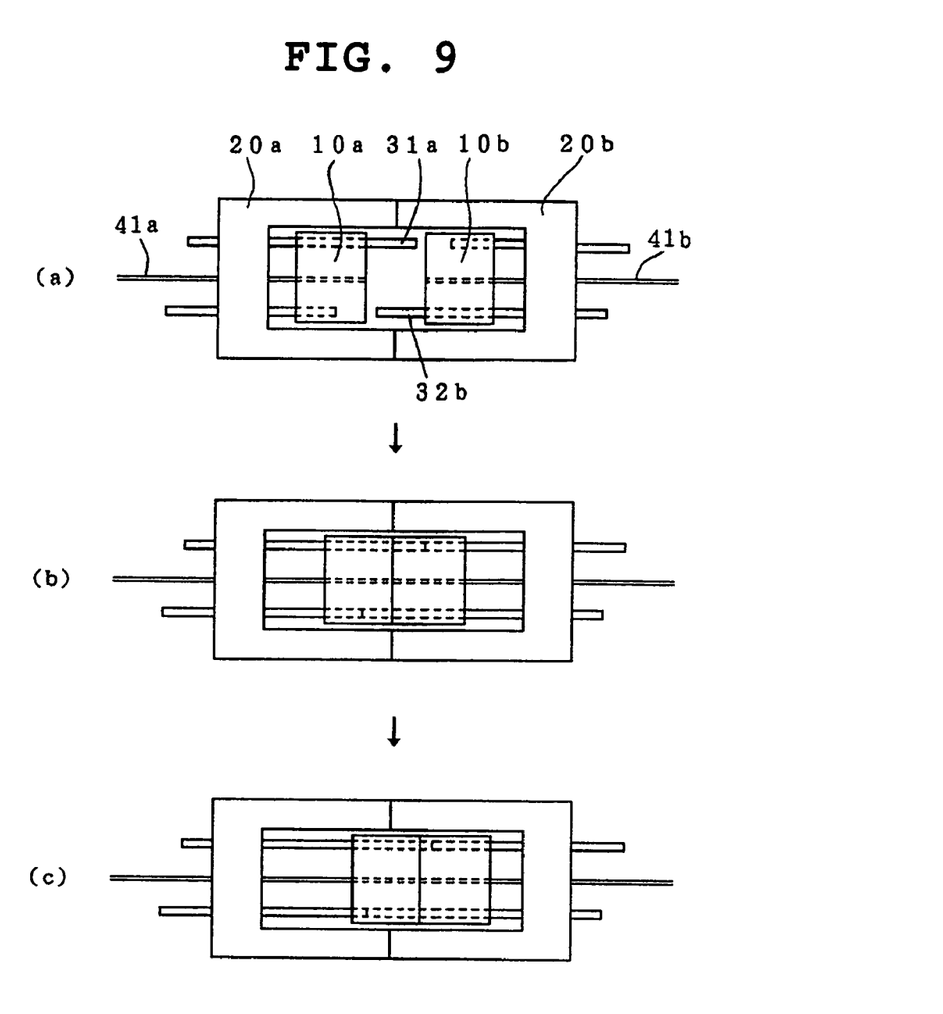
FIG. 9 is a flow chart illustrating another exemplary connecting method according to the present invention.

FIG. 9 is a flow chart illustrating another exemplary connecting method according to the present invention. In this case, one of guide pins (31a) penetrates the connection member 10a and the other guide pin 32b penetrates the connection member 10b (FIG. 9(a)). These two connection members are opposed to each other, and the projecting guide pins are inserted into the respective guide hole of the opposed other connection member so that the two connection members are arranged and brought face to face with each other (FIG. 9(b)). The two connection members 10a and 10b are then allowed to simultaneously slide in one direction (right direction in the drawing) along the guide pins. Thus a connection structure wherein the optical fibers 41a and 41b are connected inside the through-hole of the connection member 10a is obtained (FIG. 9(c)). According to the above-mentioned structure that the two optical fibers are inserted in one through-hole, there is no change in position accuracy of ends of the optical fibers, even if the through-hole shifts by thermal expansion, etc. Furthermore, in case of connecting multi-core optical fibers, connection of the fibers can be stabilized, and there is little variation in the connection loss among every pairs of optical fibers.

In the above mentioned case of the present invention, the optical fibers may be connected with each other by fixing the optical fiber to each plug so that the end of the optical fiber is located inside the connection component a few microns to several 10 microns apart from the end of the plug, and applying a refractive index matching agent between the ends of the fibers. In case that the plugs are brought face to face with each other, it is only necessary to adjust the axial direction of the optical fibers, since the distance between optical fibers does not change by repeated operations for connection, and then stabilized connection can be repeatedly conducted. Further, since adjustment of a distance between edges of each pair of fibers to be connected is not required, stabilized connection can be obtained, when the optical fiber is fixed to the plug. Regarding the refractive index matching agent, it is possible to select depending on refractive index and material of the optical fiber. For example, silicone oil, silicone grease, etc. are preferably used. Moreover, when the optical fibers are fixed temporarily to each plug, it is possible to bring the optical fibers face to face with each other by pushing one or both optical fibers so as to move minutely, after the ends of the optical fibers are aligned.

Figure 10:
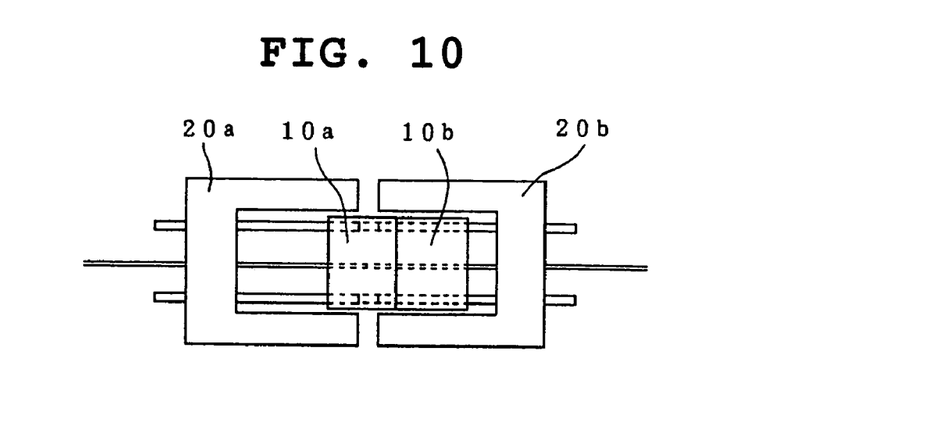
FIG. 10 is a plane view of an exemplary optical fiber connection structure according to the present invention.

In the optical fiber connecting method according to the present invention, the connection members 10a and 10b may be brought face to face with each other in such a state that the plugs 20a and 20b are opposed at regular intervals without contacting the end surface of the plug 20a with the end surface of the plug 20b, as illustrated in FIG. 10. In such a case, the optical fibers may be connected by approaching the end surfaces of the plugs each other so as to bringing the optical fibers face to face with each other.

Figure 11:
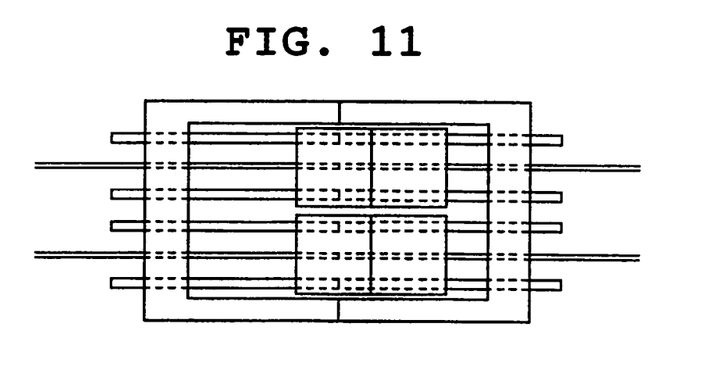
FIG. 11 is a plane view of another exemplary optical fiber connection structure according to the present invention.

FIG. 11 is a plane view of another exemplary optical fiber connection structure according to the present invention. In case of this drawing, the connection structure has two pairs of connection members installed in each plug, which can be formed by providing two optical fiber connection components into which an optical fiber is inserted as illustrated in FIG. 4 and connecting the optical fibers as shown in FIG. 8.

An optical fiber connection structure in which two connection members are piled up in a perpendicular direction can be similarly formed using optical fiber connection components as illustrated in FIG. 5. Moreover, an optical fiber connection structure may be formed using an integrated plug which is prepared by fixing plural plugs arranged in a row or piled up.

No particular limitation is not imposed on the method of fixing the optical fiber(s) to the plug so far as the optical fibers are fixed to the plug strongly enough not to move in the end direction, and the connecting method may be suitably chosen for use depending on the application purposes. An adhesive may be applied to the holes or grooves for fixation. Any adhesives may be used, if stress strain is not applied on the optical fiber by adhesion. For example, various kinds of pressure sensitive adhesives, thermoplastic adhesives, thermosetting adhesives, ultraviolet ray (UV) hardening adhesives of urethane, acryl, epoxy, nylon, phenol, polyimide, vinyl, silicone, rubber, fluorinated epoxy, fluorinated acryl and fluorinated polyimide types can be used. The UV hardening adhesives and thermoplastic adhesives are preferably used because of easy handling.

In a method of fixing temporarily, the optical fiber is fixed to the plug with an adhesive which is easily transformed such as rubber type adhesive, etc. Alternatively, the optical fiber is inserted in a through-hole of the plug and a member for temporarily fixing is fixed to the plug by means of a spring or an elastomer so that the optical fiber moves in the axial direction by pressing.

EXAMPLE

The present invention will hereafter be described in detail by the following examples. However, the present invention is not limited to these examples.

Example 1

Figure 12:
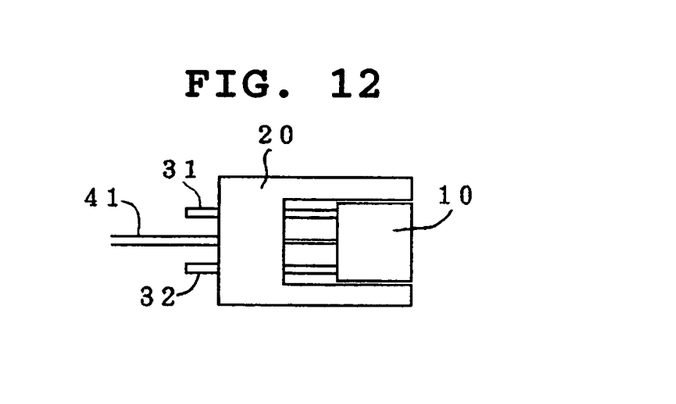
FIG. 12 is a plane view of the optical fiber connection component of Example 1.
Figure 13:
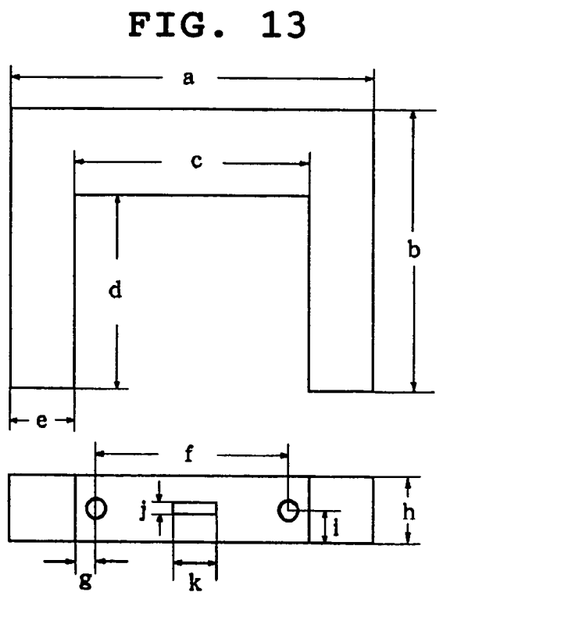
FIG. 13 is a view illustrating size of the plug in Example 1.
Figure 14:
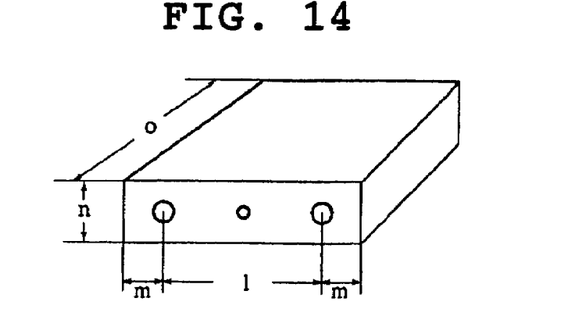
FIG. 14 is a view illustrating size of the connection member in Example 1.

In order to fabricate an optical fiber connection component as illustrated in FIG. 12, two plugs as illustrated in FIG. 13 and two connection members having a through-hole as illustrated in FIG. 14 were made of an acrylic resin. Each of them had the size of a=14 mm, b=20 mm, c=10 mm, d=15 mm, e=2 mm, f=6 mm, g=2 mm, h=4 mm, i=2 mm, j=0.5 mm, k=2.3 mm, l=6 mm, m=1 mm, n=4 mm, and o=10 mm. The diameter of guide hole was 1 mm and the diameter of the through-hole of the connection member was 0.126 mm. Coat of an optical fiber (product of The Furukawa Electric Co., Ltd.; diameter: 250 μm) was then removed by 20 mm from an end to expose a cladding of the optical fiber. The cladding and core of the optical fiber were cut at a portion 5 mm away from the end to adjust the length of the exposed cladding to 15 mm. The connection member was mounted on the plug by inserting guide pins in the plug, inserting the optical fiber into a hole for fixing the optical fiber and then into a through-hole of the connection member, and inserting the guide pins into each guide hole of the connection member. After the optical fiber was arranged so that the end of the cladding was located to the edge of the plug, the optical fiber was fixed to the plug at the center of the hole for fixing the optical fiber by means of an epoxy adhesive (EP-007; product of Cemedine Co., Ltd.). The connection member was arranged so that the end of the cladding was located to the edge of the connection member, thereby completing an optical fiber connection component.

Figure 15:
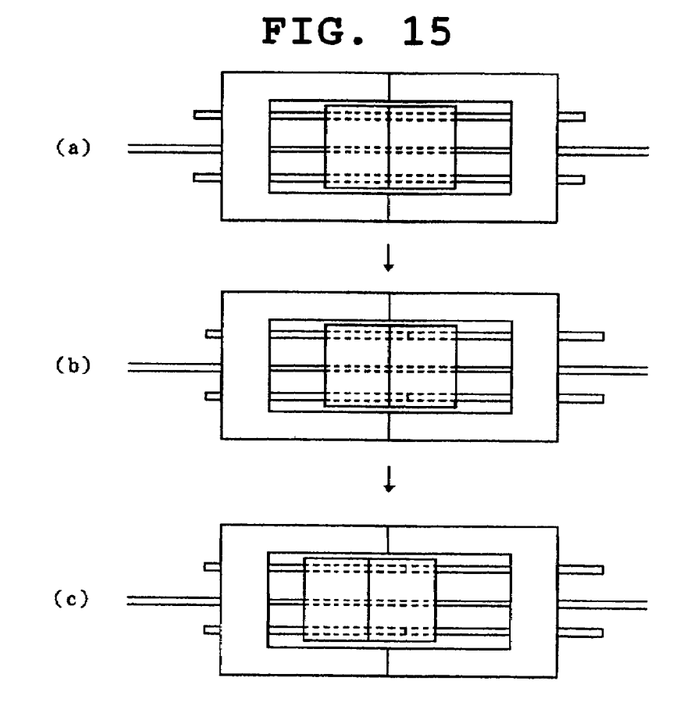
FIG. 15 is a flow chart illustrating the method of connecting optical fibers in Example 1.

The optical fibers were connected by a method illustrated in FIG. 15. First, the thus obtained two optical fiber connection components were brought face to face with each other (FIG. 15(a)). Two guide pins of the optical fiber connection component in the left hand were pushed rightward to move 2 mm so that the guide pins were located inside the optical fiber connection component in the right hand (FIG. 15(b)). Thereafter, the two connection members were allowed to slide 2 mm leftward simultaneously, thereby completing the connection of the optical fibers (FIG. 15(c)).

In the obtained optical fiber connection structure, the optical fibers were prevented from being damaged upon connecting them, because each cladding which was easily damaged was inserted in the through-hole of the connection member. Moreover, connection between the optical fibers was feasible with ease.

Thereafter, a connection loss was measured at the coupling point of the optical fibers and found to be 0.7 dB or less. The connection structure was thus sufficiently usable as an optical connection structure.

Example 2

Figure 16:
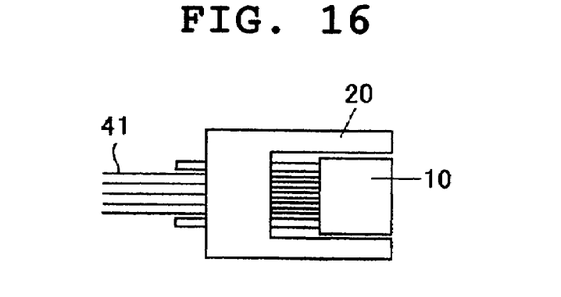
FIG. 16 is a plane view of the optical fiber connection component of Example 2.
Figure 17:
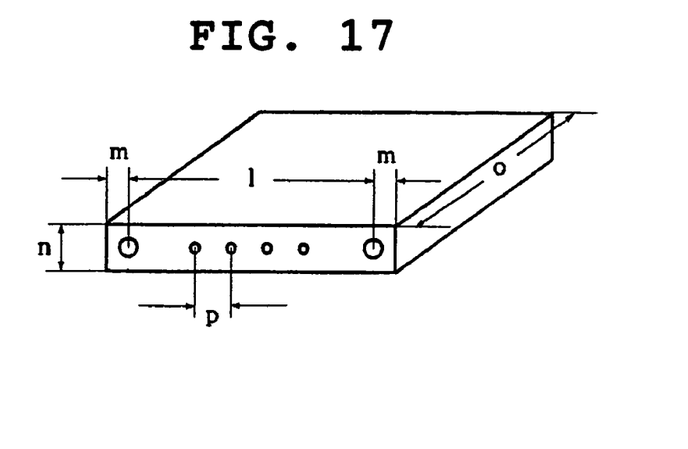
FIG. 17 is a view illustrating size of the connection member in Example 2.

In order to fabricate an optical fiber connection component as illustrated in FIG. 16, two plugs 20 as illustrated in FIG. 13 and two connection members 10 having four through-holes as illustrated in FIG. 17 were made of an acrylic resin. Each of them had the size of a=14 mm, b=20 mm, c=10 mm, d=15 mm, e=2 mm, f=6 mm, g=2 mm, h=4 mm, i=2 mm, j=0.5 mm, k=1.3 mm, l=6 mm, m=1 mm, n=4 mm, o=10 mm and p=0.25 mm. The diameter of the guide holes was 1 mm and the diameter of the four through-holes of the connection member was 0.126 mm. Coats of eight optical fibers (products of The Furukawa Electric Co., Ltd.; diameter: 250 μm) were then removed by 20 mm from their ends to expose claddings of the optical fibers. The claddings and cores of the optical fibers were cut at a portion 5 mm away from an end to adjust the length of the exposed claddings to 15 mm. The connection member was installed in the plug by inserting two guide pins in the plug, inserting four optical fibers into each hole for fixing the optical fiber and then into each through-hole of the connection member, and inserting the guide pins into each guide hole of the connection member. After the optical fibers were arranged so that the ends of the claddings were located to the edge of the plug, the four optical fibers were fixed to the plug at the center of the holes for fixing the optical fiber by means of an epoxy adhesive (EP-007; product of Cemedine Co., Ltd.). The connection member was arranged so that the ends of each cladding were located to the edge of the connection member, thereby completing an optical fiber connection component into which optical fibers were inserted.

Figure 18:
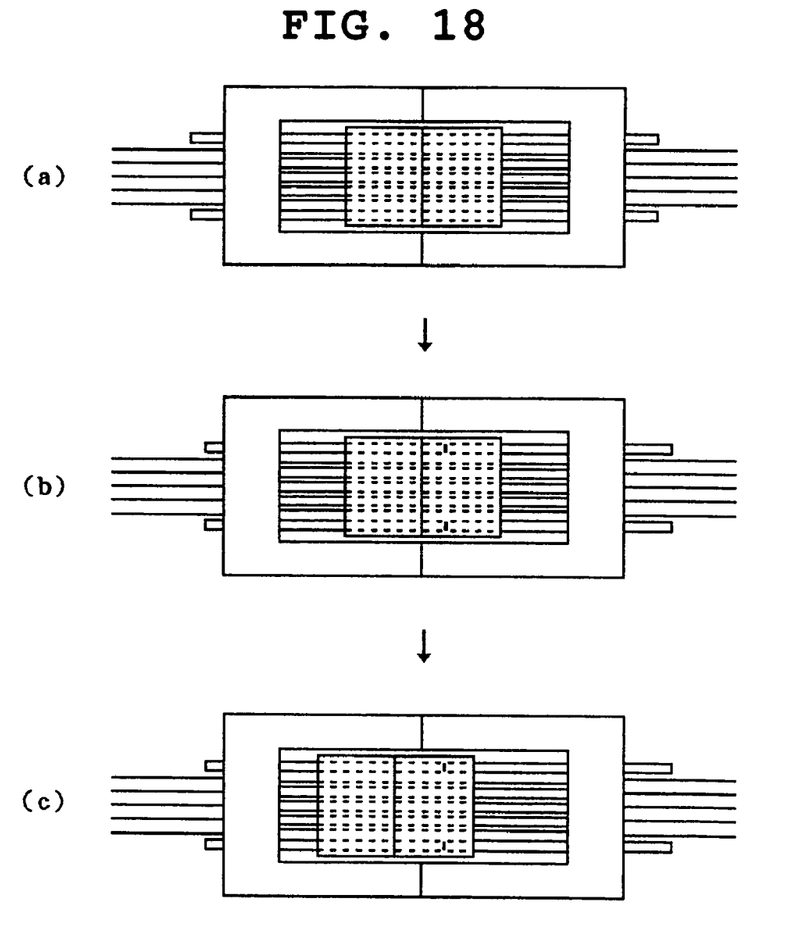
FIG. 18 is a flow chart illustrating the method of connecting optical fibers in Example 2.

The optical fibers were connected by the method illustrated in FIG. 18. First, the thus obtained two optical fiber connection components were brought face to face with each other (FIG. 18(a)). Two guide pins of the optical fiber connection component in the left hand were pushed rightward to move 2 mm so that the guide pins were located inside the optical fiber connection component in the right hand (FIG. 18(b)). Thereafter, the two connection members were allowed to simultaneously slide 2 mm leftward, thereby completing the connection of the optical fibers (FIG. 18(c)).

In the obtained optical fiber connection structure, the optical fibers were prevented from being damaged upon connecting them, because the claddings which were easily damaged were inserted in the through-holes of the connection members. Moreover, connection between the optical fibers was feasible with ease.

Thereafter, a connection loss was measured at the junction points of the optical fibers and found to be 0.7 dB or less. The connection structure was thus sufficiently usable as an optical connection structure.

Example 3

Figure 19:
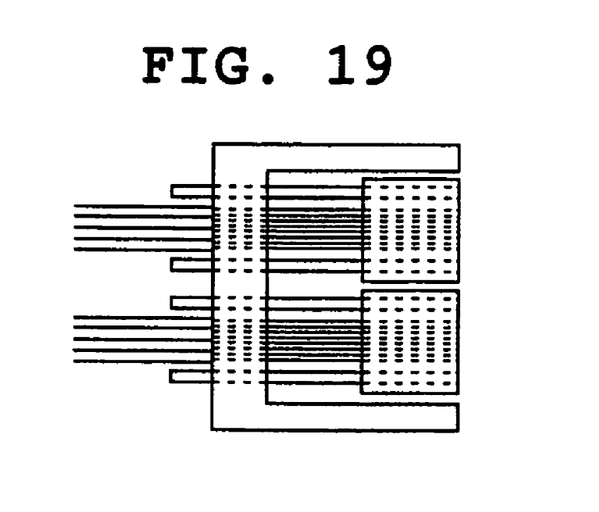
FIG. 19 is a plane view of the optical fiber connection component of Example 3.
Figure 20:
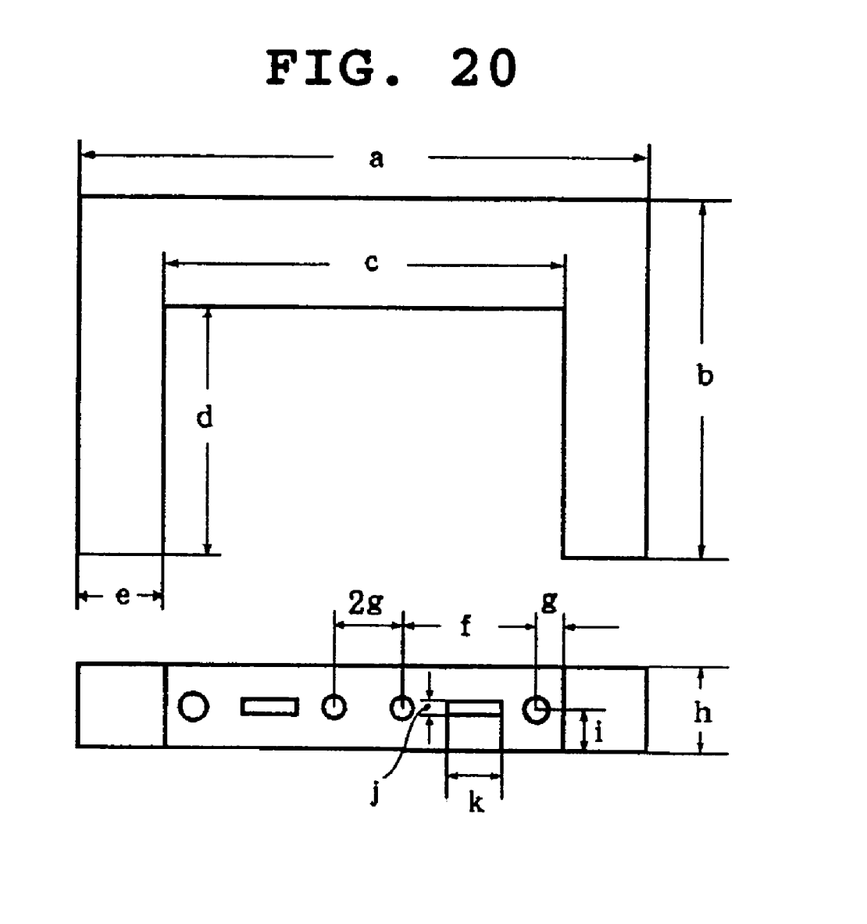
FIG. 20 is a view illustrating size of the plug in Example 3.

In order to fabricate an optical fiber connection component as illustrated in FIG. 19, two plugs as illustrated in FIG. 20 and two connection members 10 having four through-holes as illustrated in FIG. 17 were made of an acrylic resin. Each of them had the size of a=24 mm, b=20 mm, c=20 mm, d=15 mm, e=2 mm, f=6 mm, g=2 mm, h=4 mm, i=2 mm, j=0.5 mm, k=2.3 mm, l=6 mm, m=1 mm, n=4 mm, o=10 mm and p=0.25 mm. The diameter of the guide holes was 1 mm and the diameter of the four through-holes of the connection member was 0.126 mm. Coats of 16 optical fibers (products of The Furukawa Electric Co., Ltd.; diameter: 250 μm) were then removed by 20 mm from their ends to expose claddings of the optical fibers. The claddings and cores of the optical fibers were cut at a portion 5 mm away from the end to adjust the length of the exposed claddings to 15 mm. The connection member was installed in the plug by inserting four guide pins in the plug, inserting eight optical fibers into each hole for fixing the optical fibers and then into each through-hole of the connection member, and inserting the guide pins into each guide hole of the connection member. After the optical fibers were arranged so that the ends of the claddings were located to the edge of the plug, the eight optical fibers were fixed to the plug at the center of the holes for fixing the optical fiber by means of an epoxy adhesive (EP-007; product of Cemedine Co., Ltd.). The connection member was arranged so that the ends of the claddings were located to the edge of the connection member, thereby completing an optical fiber connection component into which optical fibers had been inserted.

Figure 21:
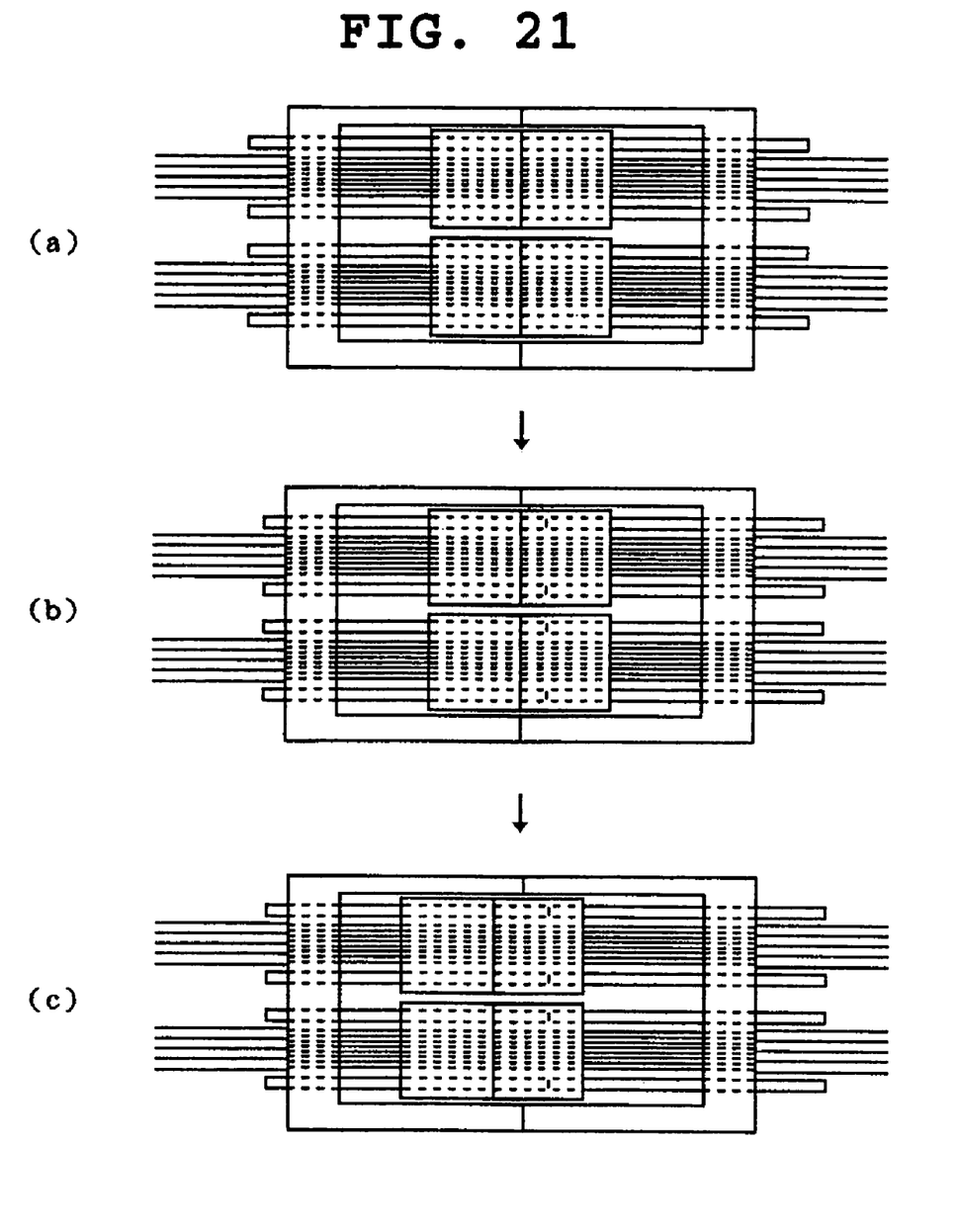
FIG. 21 is a flow chart illustrating the method of connecting optical fibers in Example 3.

The optical fibers were connected by the method illustrated in FIG. 21. First, the thus obtained two optical fiber connection components were brought face to face with each other (FIG. 21(a)). Four guide pins of the optical fiber connection component in the left hand were pushed rightward to move 2 mm so that the four guide pins were located inside the optical fiber connection component in the right hand (FIG. 21(b)). Thereafter, the two connection members were allowed to simultaneously slide 2 mm leftward, thereby completing the connection of the optical fibers (FIG. 21(c)).

In the obtained optical fiber connection structure, the optical fibers were prevented from being damaged upon connecting them, because the claddings which were easily damaged were inserted in the through-holes of the connection members. Moreover, connection between the optical fibers was feasible with ease.

Thereafter, a connection loss was measured at the coupling points of the optical fibers and found to be 0.7 dB or less. The connection structure was thus sufficiently usable as an optical connection structure.

Example 4

Figure 22:
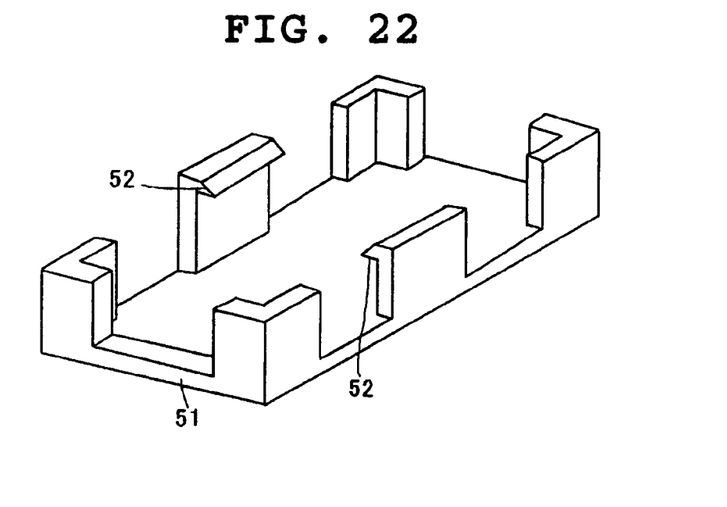
FIG. 22 is a perspective view of the adapter used in Example 4.

This example illustrates a case of connecting optical fibers using an adapter having a structure shown in FIG. 22. As illustrated in FIG. 22, the adapter 51 was provided with latches 52 in the centers of side boards so as to fix two optical fiber connection components in which optical fibers had been inserted into through-holes.

Figure 23:
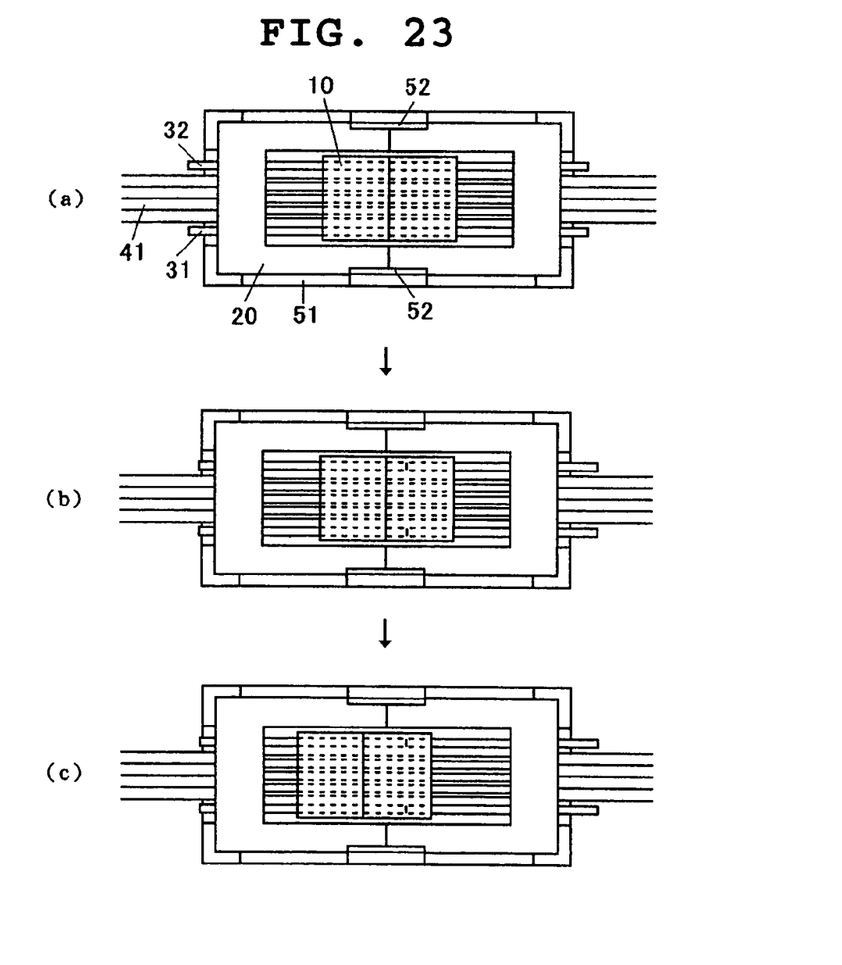
FIG. 23 is a flow chart illustrating the method of connecting optical fibers in Example 4.

Two optical fiber connection components were prepared in the similar manner to Example 2 by inserting four optical fibers into each hole for fixing the optical fiber of the plug 20, inserting claddings into each through-hole of the connection member 10, and inserting guide pins 31 and 32 into each guide hole of the connection member. Thus resultant connection components were attached and fixed to the above-mentioned adapter (FIG. 23(a)). Two guide pins of the optical fiber connection component in the left hand were then pushed rightward to move 2 mm so that the two guide pins were located inside the optical fiber connection component in the right hand (FIG. 23(b)). Thereafter, the two connection members were allowed to simultaneously slide 2 mm leftward, thereby completing the connection of the optical fibers (FIG. 23(c)).

In the obtained optical fiber connection structure, the optical fibers were prevented from being damaged upon connecting them, because the claddings which would be easily damaged were inserted in the through-holes of the connection member. Moreover, connection between the optical fibers was more feasible with ease, because plugs, to which optical fibers were fixed, were fixed to the adapter so that the opposed state of plugs was kept stable. Furthermore, the distance between optical fibers was stabilized, and the connection of the optical fibers was kept stable.

Thereafter, a connection loss was measured at the coupling points of the optical fibers and found to be 0.7 dB or less. The connection structure was thus sufficiently usable as an optical connection structure.

INDUSTRIAL AVAILABILITY

Since the optical fiber connection component according to the present invention has above-mentioned constitution, adjusting the distances between ends of each optical fiber pair can be easily conducted upon aligning the optical fibers and, particularly, claddings of the optical fibers, from which a coating has been removed when it is applied for the optical connection between optical fibers led out of ends thereof such as optical elements, optical circuit packages, optical circuit devices, etc. And optical fibers are prevented from being damaged upon carrying or connecting them, because the connection member is arranged in the plug. In addition, connecting workability can be improved, because parts necessary for connection are not dispersed or lost or its position does not shift. Further, it becomes possible to decrease the number of parts for connection since the connection members can be stably positioned to each other. Accordingly, connection of optical fibers can be conducted at low cost because of using only few parts. Furthermore, the optical fiber connection structure according to the present invention can be applied for multi-core connection. Namely, position of each fiber is not affected, and dispersion of the connection loss at the junction points of the optical fibers is narrow, and so multi-core connection can be easily conducted.

The invention claimed is:

1. A method of connecting optical fibers comprising:
providing two optical fiber connection components, each comprising:
a connection member having (i) one or more through-holes each for slidably guiding an optical fiber therethrough and (ii) guides each for slidably guiding a rodlike coupling member, said through-holes and said guides extending from one edge to another in a sliding direction;
a turned square U-shaped plug having a bottom portion and two side portions, wherein the connection member is positioned between the two side portions, said bottom portion having (I) one or more through-holes or grooves each for inserting the optical fiber and (II) guide holes each for guiding the rodlike coupling member;
rodlike coupling members inserted into the respective guides of the connection member through the respective guide holes of the turned square U-shaped plug; and
an optical fiber or optical fibers each inserted into each through-hole of the connection member through each through-hole or groove of the turned square U-shaped plug, wherein an end of a cladding of the optical fiber is leveled with an edge of the connection member and the optical fiber is fixed to the turned square U-shaped plug;
opposing and contacting the two optical fiber connection components facing the edge of each connection member to align the rodlike coupling members and the optical fiber(s) of the two optical fiber connection components, wherein the ends of the respective optical fibers are connected; and
sliding the connection members together in the sliding direction toward one of the bottom of the turned square U-shaped plug along the rodlike coupling members guided by the guides so that the connected ends of the optical fibers are located inside the through-hole of one of the connection members.

2. The method according to claim 1, wherein the two optical fiber connection components have identical configurations.

3. An optical fiber connection structure which is formed by
opposing two optical fiber connection components each comprising (i) a connection member having one or more through-holes each for slidably guiding an optical fiber therethrough and guides each for slidably guiding a rodlike coupling member, said through-holes and said guides extending from one edge to another in a sliding direction, (ii) rodlike coupling members, and (iii) a turned square U-shaped plug having one or more through-holes or grooves each for inserting the optical fiber and guide holes each for guiding the rodlike coupling member on the bottom of the concavity of square U-shape,
wherein the optical fiber is arranged such that an end of a cladding of the optical fiber placed in the through-hole of the connection member is located to an edge of the connection member, and the optical fiber is fixed to the turned square U-shaped plug,
said connection member is arranged slidably in said plug by being installed in the concavity of square U-shape of said plug by means of each rodlike coupling member inserted in both said plug and said connection member, in such a state that the optical fibers are inserted respectively in said through-holes for the optical fibers,
bringing the through-holes of both connection members face to face with each other, and
sliding said connection members together in a direction of the center axis of the optical fibers along the rodlike coupling members guided by the guides, so that the optical fibers are connected in the through-hole of one of the connection members.

4. The optical fiber connection structure according to claim 3 wherein a refractive index matching agent is used for connecting the optical fibers.

5. The optical fiber connection structure according to claim 3 wherein the optical fiber connection component is fixed to an adapter.

6. The optical fiber connection structure according to claim 3, wherein the guides of the connection member are provided at or near both side edges with respect to the sliding direction.

7. An optical fiber connecting method which comprises:
opposing two optical fiber connection components each comprising (i) a connection member having one or more through-holes each for slidably guiding an optical fiber therethrough and guides each for slidably guiding a rodlike coupling member, said through-holes and said guides extending from one edge to another in a sliding direction, (ii) rodlike coupling members, and (iii) a turned square U-shaped plug having one or more through-holes or grooves each for inserting the optical fiber and guide holes each for guiding the rodlike coupling member on the bottom of the concavity of square U-shape,
wherein the optical fiber is arranged such that an end of a cladding of the optical fiber placed in the through-hole of the connection member is located to an edge of the connection member, and the optical fiber is fixed to the turned sciuare U-shaped plug,
said connection member is arranged slidably in said plug by installed in the concavity of square U-shape of said plug by means of each rodlike coupling member inserted in both said plug and said connection member in such a state that the optical fibers are inserted respectively in said through-holes for optical fiber,
bringing the through-holes of both connection members face to face with each other, and
sliding said connection members together in a direction of the center axis of the optical fibers along the rodlike coupling members guided by the guides, so that the optical fibers are connected in the through-hole of one of the connection members.

8. The optical fiber connecting method according to claim 7 which comprises attaching said two optical fiber connection components to an adapter and bringing the through-holes of them face to face each other.

9. The optical fiber connecting method according to claim 7 wherein optical fibers inserted respectively in the through-holes of the connection members are fixed to the plugs by an adhesive.

10. The optical fiber connecting method according to claim 7, wherein the guides of the connection member are provided at or near both side edges with respect to the sliding direction.

* * * * *

UNITED STATES PATENT AND TRADEMARK OFFICE
CERTIFICATE OF CORRECTION

| | | |
|---|---|---|
| PATENT NO. | : 7,192,196 B2 | Page 1 of 1 |
| APPLICATION NO. | : 10/521372 | |
| DATED | : March 20, 2007 | |
| INVENTOR(S) | : Kyoichi Sasaki et al. | |

It is certified that error appears in the above-identified patent and that said Letters Patent is hereby corrected as shown below:

At column 13, line 30, delete "sciuare" and insert --square--, therefor.

Signed and Sealed this

Tenth Day of July, 2007

JON W. DUDAS
*Director of the United States Patent and Trademark Office*